United States Patent [19]

McKee

[11] Patent Number: 5,069,410
[45] Date of Patent: Dec. 3, 1991

[54] MOUNT FOR A SUPPORT BRACKET

[76] Inventor: Clyde E. McKee, 22175 Bernard St., Taylor, Mich. 48180

[21] Appl. No.: 80,821

[22] Filed: Aug. 3, 1987

[51] Int. Cl.$^5$ ............................................. B60R 1/00
[52] U.S. Cl. ................................................ 248/475.1
[58] Field of Search ................. 248/475.1, 479, 359.1, 248/916; 403/221, 225; 16/342

[56] References Cited

U.S. PATENT DOCUMENTS

| | | | |
|---|---|---|---|
| 3,860,213 | 1/1975 | Heenan | 248/916 |
| 4,281,815 | 8/1981 | O'Connell | 248/479 |
| 4,306,701 | 12/1981 | Nierhaus | 248/479 |
| 4,428,094 | 1/1984 | Emain | 16/342 X |
| 4,500,063 | 2/1985 | Schmidt et al. | |
| 4,639,147 | 1/1987 | Schwarz | 16/342 X |

FOREIGN PATENT DOCUMENTS 183672 11/1955 Austria ................................ 16/342

Primary Examiner—Ramon O. Ramirez
Assistant Examiner—Robert A. Olson
Attorney, Agent, or Firm—Gifford, Groh, Sprinkle, Patmore and Anderson

[57] ABSTRACT

A mount for a support bracket for a mirror or like structure includes a base member adapted to be mounted to a vehicle and a cover member adapted to sandwich a leg of the support bracket against the base member. A rubberized sleeve is inserted over the support bracket leg to increase the resistance to rotation of the support bracket within the mount. Alternatively, strips or bands of friction increasing material may be used in place of the sleeve to increase resistance to rotation.

4 Claims, 1 Drawing Sheet

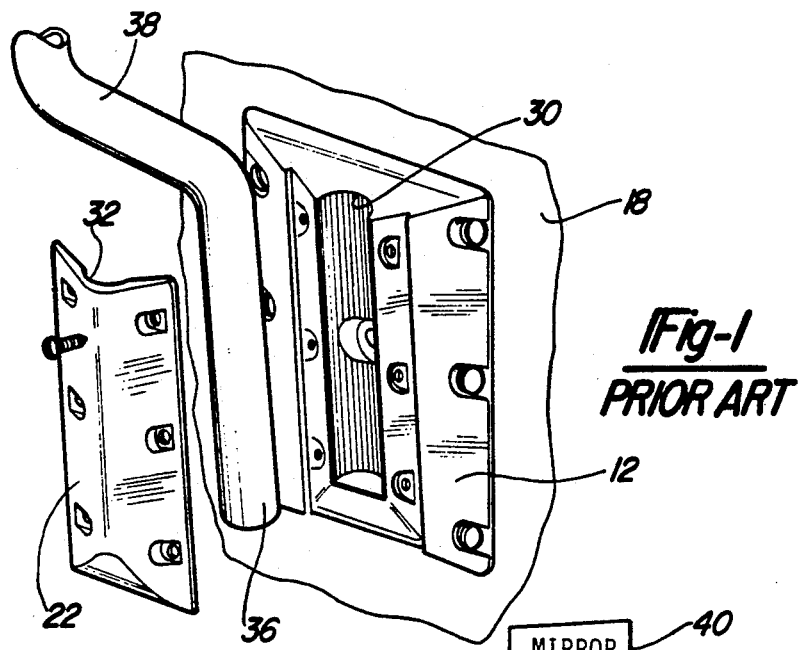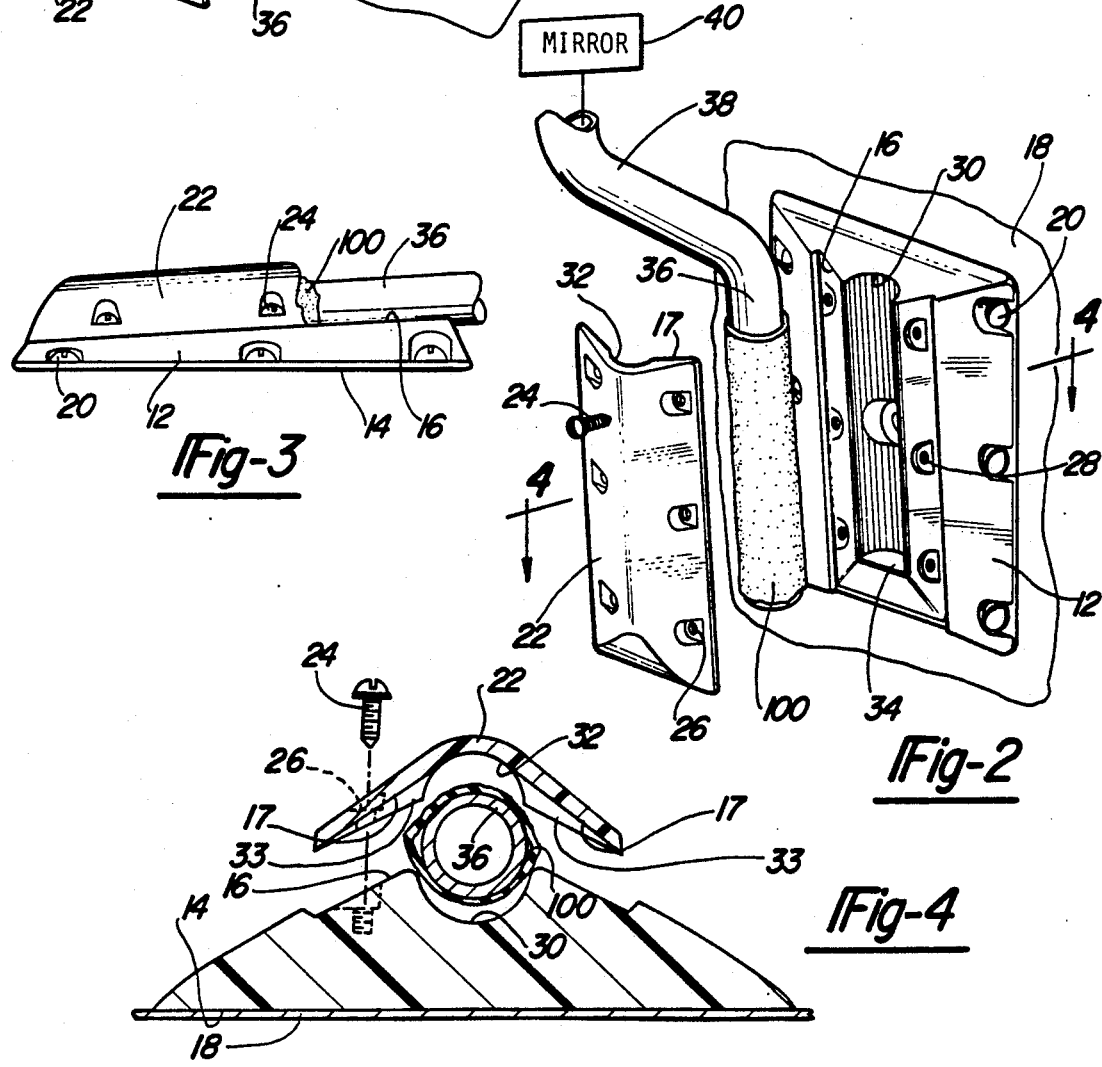

MOUNT FOR A SUPPORT BRACKET

BACKGROUND OF THE INVENTION

I. Field of the Invention

This invention relates to support bracket mounts and, in particular, to a mount for attaching a mirror support bracket to the fender of a vehicle.

II. Description of the Prior Art

It has previously been known to provide a mount for support brackets for mirrors and the like, having a base member and a cover member which are securable together to retain a leg of the support bracket. U.S. Pat. No. 4,500,063, issued Feb. 19, 1985, to Schmidt et al, typifies a support bracket of this type and is shown in FIG. 1. U.S. Pat. No. 4,500,063 is incorporated herein by reference.

Referring to FIG. 1, Schmidt et al disclose a mount in which the base member 12 and transverse ribs (not shown) in the cover member 22 form an aperture (at 30, 32) into which a leg 36 of the support bracket 38 is inserted. The ribs in the cover member 22 grip the support bracket 38 as the cover member is secured to the base member 12. This arrangement has worked well to support a mirror or the like out away from a the vehicle 18 to provide improved visibility of the blind spots of the vehicle. However, a major disadvantage of the previously known mounts is that vibrations of the vehicle often cause the support bracket leg to rotate within the mount, thus causing misalignment of the mirror.

SUMMARY OF THE INVENTION

This major disadvantage of the previously known support bracket mounts is overcome by the present invention which provides an improved means for increasing the frictional resistance between the support bracket leg and the portions of the base member and cover member which define the cylindrical aperture into which the bracket leg is inserted.

Preferably, the means for increasing resistance comprises a thin rubber sleeve disposed around the support bracket leg, said sleeve having an internal surface in contact with the leg and an external surface in contact with the outer surface of the base member, the curved edge of the transverse rib, or both. Although the preferred embodiment of the invention comprises a rubber sleeve, the invention comprehends other means of increasing the friction, including sleeves made of other materials and non-sleeve elements such as strips or bands of friction increasing materials.

BRIEF DESCRIPTION OF THE DRAWINGS

The present invention will be more fully understood by reference to the following detailed description when read in conjunction with the accompanying drawing in which like reference characters refer to like parts throughout the several views and in which:

FIG. 1 is a perspective view of a support bracket mount of the prior art;

FIG. 2 is a perspective view of a support bracket mount according to the present invention;

FIG. 3 is a side plan view rotated to a horizontal position; and

FIG. 4 is a cross sectional view taken substantially along line 4—4 of FIG. 2.

DETAILED DESCRIPTION OF THE PREFERRED EMBODIMENT

Referring first to FIG. 2, a support bracket mount according to the present invention is thereshown comprising all of the elements of the support bracket mount of the prior art shown in FIG. 1. Those elements which the two drawing figures have in common have been given the same reference numerals for easy comparison. In addition, a means for increasing the frictional resistance between the portions of the base member and the cover member which define the cylindrical aperture is shown in FIG. 2.

Referring to FIGS. 2, 3 and 4, the support bracket mount 10 of the present invention more specifically comprises a base member 12 having on one side a mounting surface 14 and on an opposite side an outer surface 16. The mounting surface 14 is adapted to be fastened to a vehicle 18 such as a truck, van or bus by means of fasteners 20 such as self tapping sheet metal screws. The opposite outer surface 16 is configured to correspond with an inner surface 17 of a cover member 22 by means of fasteners 24 which pass through apertures 26 and are threaded into the base member 12 as shown at 28. In the preferred embodiment, three pairs of fasteners 20 attach the base member 12 to the vehicle 18 and three pairs of fasteners 24 attach the cover member 22 to the base member 12. It is also preferred that the cover member 22 and the base member 12 have recesses as shown in the drawings at the apertures through which the fasteners 20 and 24 extend to enable proper seating and alignment of the fasteners 20 and 24.

A portion 30 of the outer surface 16 of the base member 12 and a portion 32 of the inner surface 17 of the cover member 22 are configured to form a cylindrical aperture when the cover member 22 is secured to the base member 12. The cylindrical aperture is open at a top end and closed at a bottom end by a floor 34 formed in the base member 12. Alternatively, the floor 34 could be formed in the cover member 22 or in both members of the mount 10.

As best shown in FIG. 4, the inner surface 17 of the cover member 22 contains a plurality of transverse ribs 33 which form a part of the portion 32 and further define the cylindrical aperture. Ideally, a semi-cylindrical aperture is formed in each of the cover member 22 and the base member 12.

The cylindrical aperture formed by the portions 30 and 32 is dimensioned to slidably receive a leg end 36 of a support bracket 38. The end opposite the leg end 36 supports a mirror or other device as shown schematically at 40.

Surrounding the leg 36 is a means for increasing the frictional resistance between the leg 36 and portions 30 and 32 of the mount 10. Preferably, the means for increasing resistance comprises a sleeve 100 extending along the leg 36 from the floor 34 to the top opening of the cylindrical aperture. In the preferred embodiment, the sleeve 100 comprises a tubular piece of rubber having a wall thickness of about .008 inches, such as a portion of a balloon. The sleeve 100 may fit snugly around leg 36 as best shown in FIG. 2 or, alternatively, it may fit loosely around the leg 36 as best shown in FIG. 4.

It is essential only that a portion of the means for increasing resistance is disposed between the leg 36 and either of the portions 30 and 32 of the base member 12 and the cover member 22, respectively, which define the cylindrical aperture. Accordingly, it is within the contemplation of the present invention that the means for increasing resistance may comprise bands disposed around the leg 36 particularly at the locations of the ribs 33. It is further within the contemplation of the present invention that the means for increasing resistance comprises strips of material extending axially along the leg 36 without necessarily circumscribing the leg 36. Moreover, it is also contemplated that the means for increasing resistance may be secured to the leg 36 as shown in FIG. 2, or it may be secured to the cover member 22 or the base member 12, or both.

Having described the structural features of the present invention its advantageous operation is easily understood. The invention provides a very efficient, yet very simple and inexpensive means for maintaining the mirror support bracket in a fixed position against rotation due to vibration of a vehicle. By increasing the resistance between the support bracket leg 36 and the portions 30, 32 of the mount 10, the support bracket 38 is held against rotation in a desired position. Consequently, the mirror is maintained in proper orientation and need not be constantly adjusted.

The foregoing detailed description of the preferred embodiment has been given for clearness of understanding only and no unnecessary limitations should be understood therefrom. Some modifications will be obvious to those skilled in the art to which the invention pertains, without deviation from the spirit of the invention as defined by the scope of the appended claims.

I claim:

1. A mounting apparatus for securing to a vehicle a mirror or the like, said apparatus comprising:
   a base member having a mounting surface adapted to be secured to a vehicle and an opposite outer surface;
   a support bracket having a cylindrical leg mounted to said outer surface of said base member;
   a cover member having an inner surface, said outer surface and said inner surface each having portions defining therebetween a cylindrical aperture dimensioned to receive said support bracket leg;
   a plurality of ribs spaced along said inner surface so as to form a portion of said cylindrical aperture along with said portion of said inner surface;
   means for increasing the frictional resistance between said support bracket leg and said inner and outer surfaces, said means for increasing being disposed between said bracket leg and said portions defining said cylindrical aperture;
   wherein said means for increasing friction comprises a resilient member disposed between said bracket leg and said portions defining said cylindrical aperture;
   means for securing said cover member to said base member wherein said portions of said inner and outer surfaces and said portions of said ribs frictionally engage said resilient member,
   wherein said means for securing said cover member to said base member radially compresses said resilient member between said leg of said support bracket and portion and ribs said portions.

2. The apparatus defined in claim 1 wherein said resilient member comprises a sleeve surrounding said support bracket leg and disposed within said cylindrical aperture.

3. The apparatus defined in claim 2 wherein said sleeve comprises rubber.

4. The apparatus defined in claim 2 wherein said sleeve has a thickness of about 0.006 inches to 0.02 inches.

* * * * *

UNITED STATES PATENT AND TRADEMARK OFFICE
CERTIFICATE OF CORRECTION

PATENT NO. : 5,069,410

DATED : December 3, 1991

INVENTOR(S) : Clyde E. McKee

It is certified that error appears in the above-identified patent and that said Letters Patent is hereby corrected as shown below:

On the Title page, item [76], "Clyde E. McKee" and insert --Clyde M. McKee--.

Signed and Sealed this

Twenty-first Day of September, 1993

*Attest:*

BRUCE LEHMAN

*Attesting Officer*  *Commissioner of Patents and Trademarks*